US006853361B2

(12) United States Patent
Tsuyuki et al.

(10) Patent No.: US 6,853,361 B2
(45) Date of Patent: Feb. 8, 2005

(54) ELECTROOPTICAL PANEL, METHOD FOR DRIVING THE SAME, AND ELECTRONIC EQUIPMENT

(75) Inventors: Tadashi Tsuyuki, Suwa (JP); Yasuhito Aruga, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 100 days.

(21) Appl. No.: 09/974,848

(22) Filed: Oct. 12, 2001

(65) Prior Publication Data

US 2002/0054006 A1 May 9, 2002

(30) Foreign Application Priority Data

Oct. 17, 2000 (JP) ........................................ 2000-317089

(51) Int. Cl.[7] ................................................ G09G 3/36
(52) U.S. Cl. ........................ 345/92; 345/103; 349/149
(58) Field of Search ............................ 345/92, 79, 96, 345/103, 87; 349/149

(56) References Cited

U.S. PATENT DOCUMENTS

| | | | | |
|---|---|---|---|---|
| 4,975,691 A | * | 12/1990 | Lee | ............................... 345/79 |
| 5,748,165 A | | 5/1998 | Kubota et al. | |
| 6,195,137 B1 | * | 2/2001 | Inaba et al. | ..................... 349/37 |
| 6,201,522 B1 | * | 3/2001 | Erhart et al. | .................... 345/96 |
| 6,229,515 B1 | * | 5/2001 | Itoh et al. | ..................... 345/103 |
| 6,327,008 B1 | * | 12/2001 | Fujiyoshi | ..................... 349/106 |
| 6,380,919 B1 | * | 4/2002 | Koyama et al. | ............... 345/92 |
| 6,522,319 B1 | | 2/2003 | Yamazaki | |

FOREIGN PATENT DOCUMENTS

| | | |
|---|---|---|
| CN | 1262761 A | 8/2000 |
| EP | 0449508 A2 | 10/1991 |
| EP | 0 986 045 A1 | 3/2000 |
| EP | 0 990 940 A1 | 4/2000 |
| JP | A 4-237021 | 8/1992 |
| JP | A 5-66424 | 3/1993 |
| KR | 1998-072745 | 11/1998 |
| KR | 1999-018059 | 3/1999 |

* cited by examiner

Primary Examiner—Guy J. Lamarre
Assistant Examiner—Fritz Alphonse
(74) Attorney, Agent, or Firm—Oliff & Berridge, PLC

(57) ABSTRACT

This present invention provides a liquid-crystal panel that presents a high-density wiring while maintaining reliability of the wiring. Odd-numbered scanning lines are connected to a first wiring group while even-numbered scanning lines are connected to a second wiring group. Each of the scanning lines is supplied with a scanning signal the polarity of which is inverted every horizontal scanning period. Among wirings forming the first wiring group and the second wiring group, a line-to-line voltage between any adjacent wirings becomes zero volt for a majority of the time. Accordingly, degradation of the wirings due to electrolytic corrosion is controlled even if the spacing between the wirings is narrowed.

5 Claims, 14 Drawing Sheets

[FIG. 1]
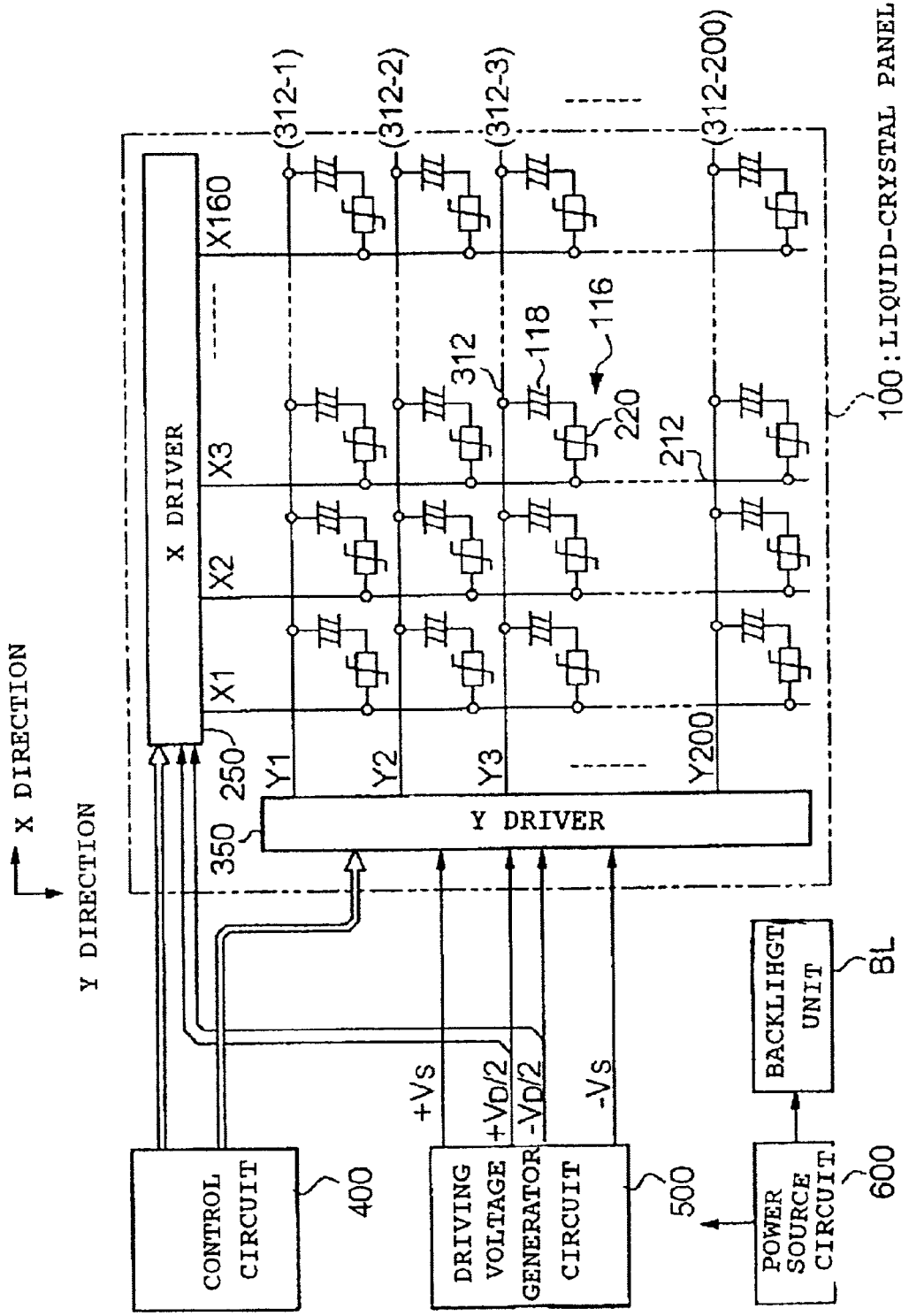

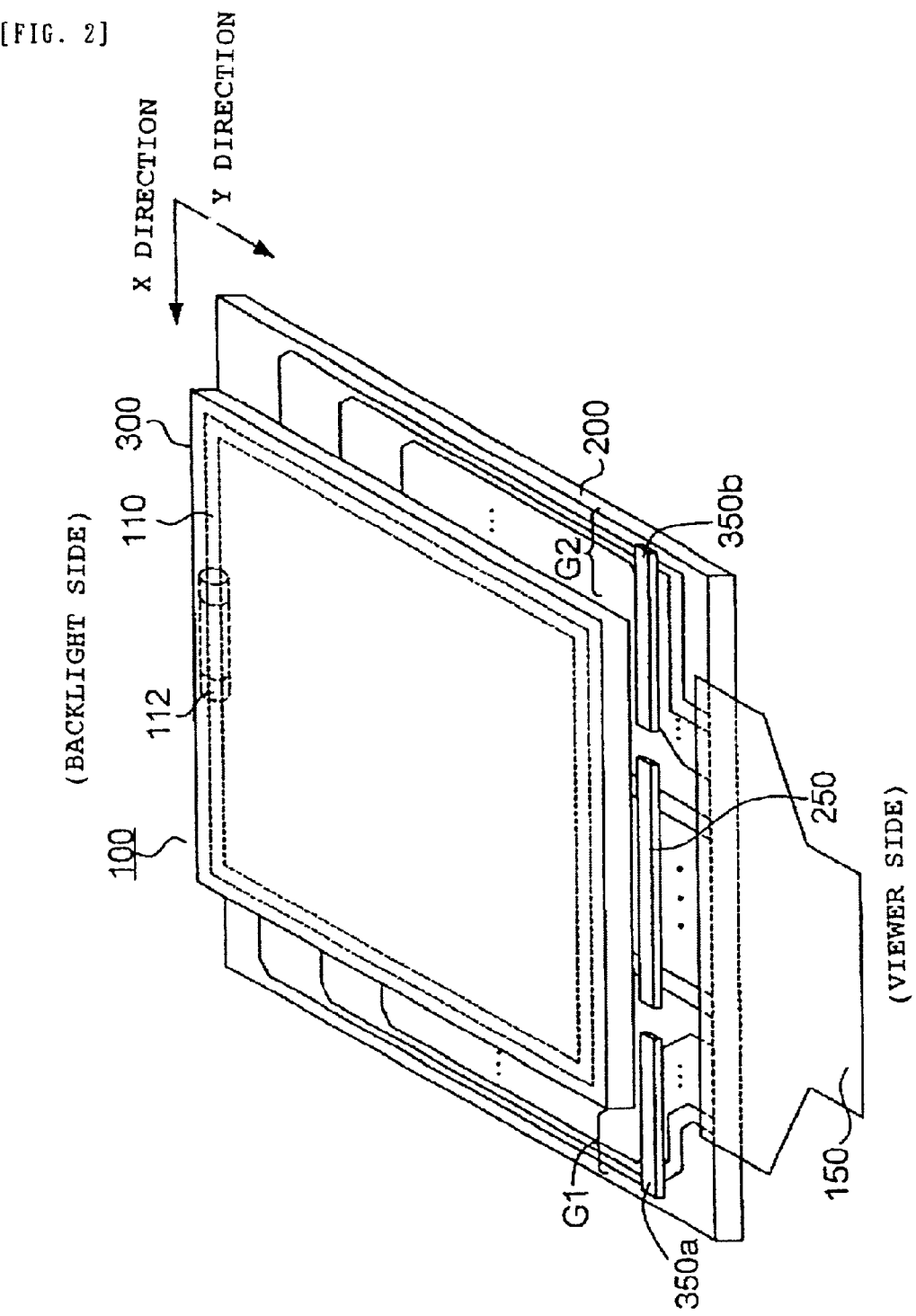

[FIG. 3]
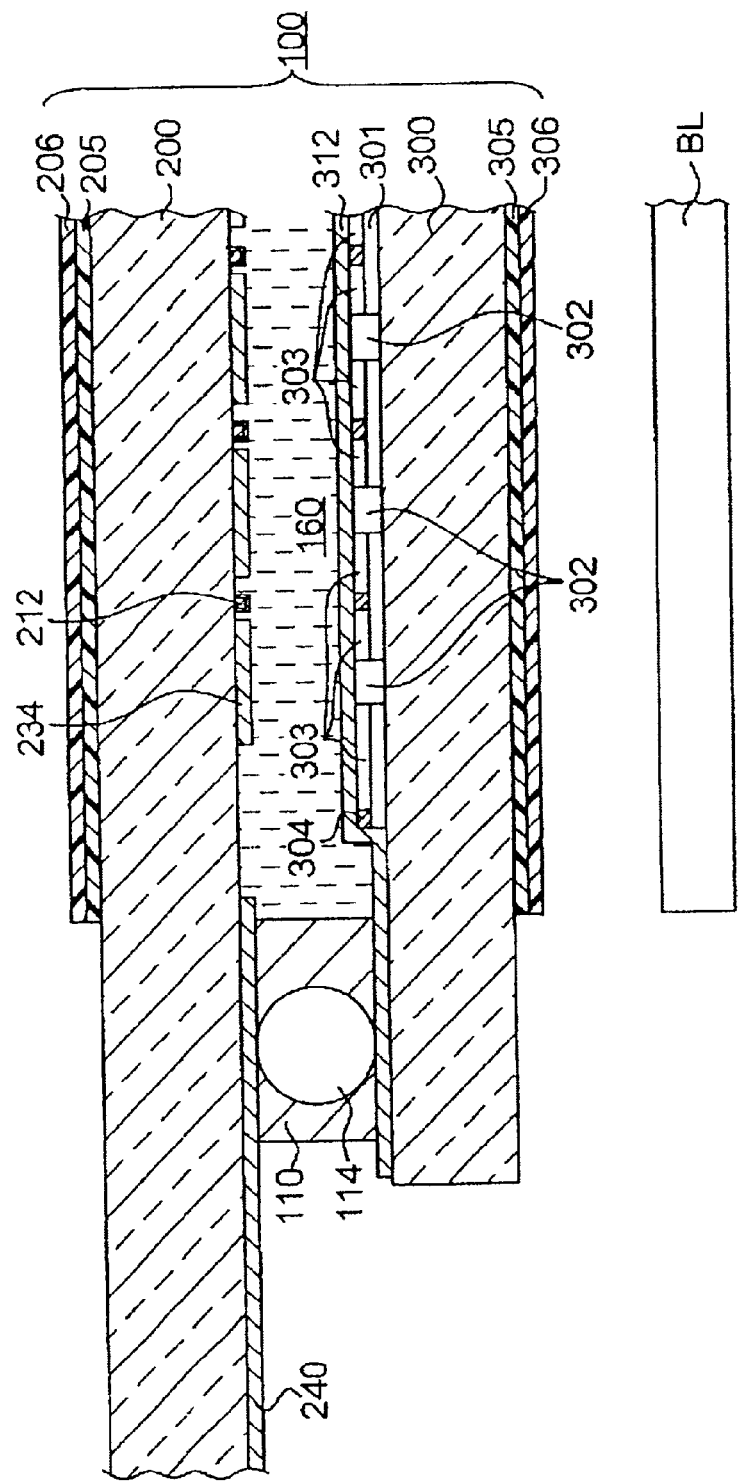

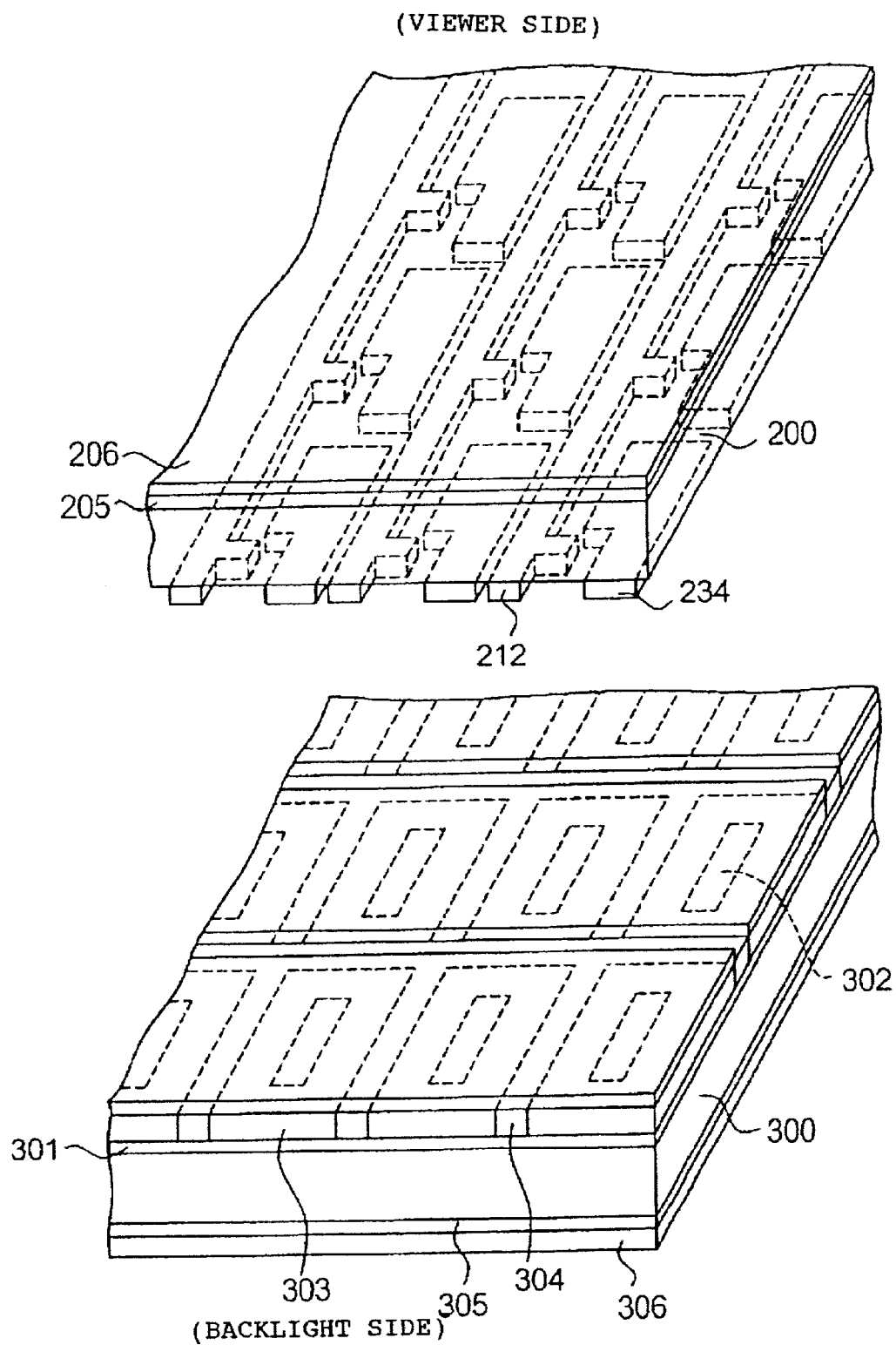

[FIG. 5]
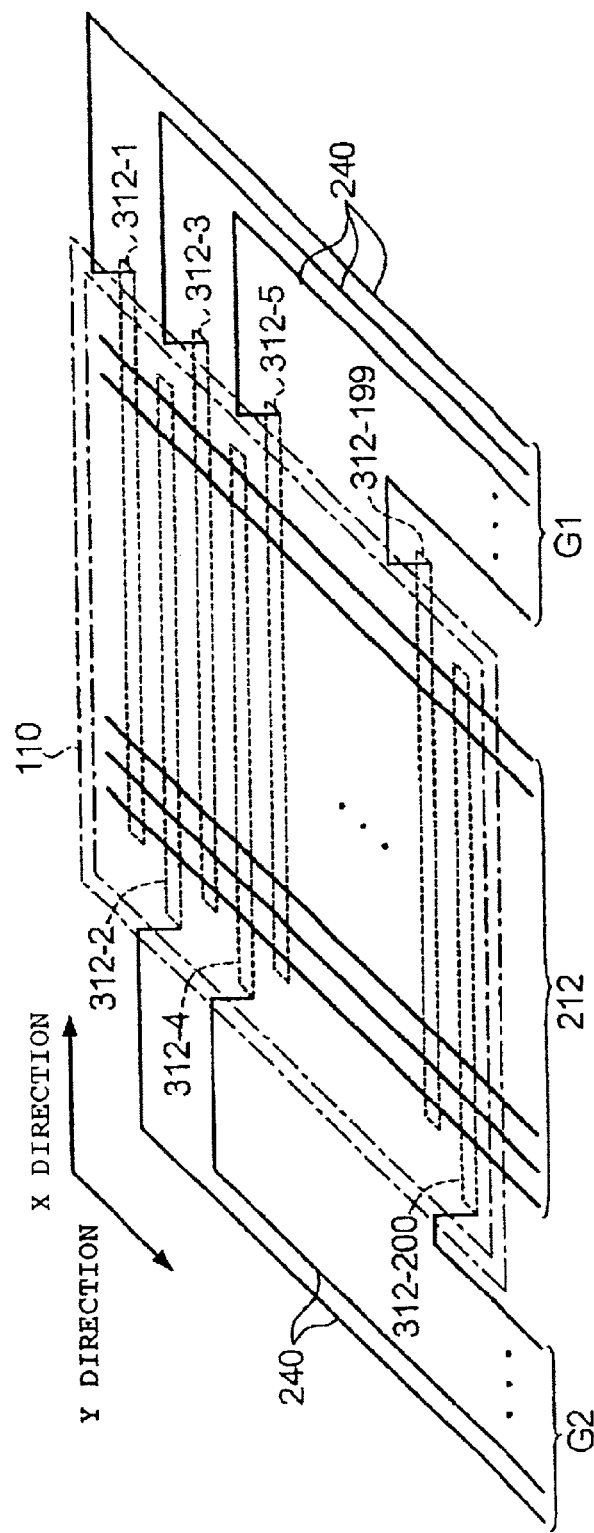

[FIG. 6]
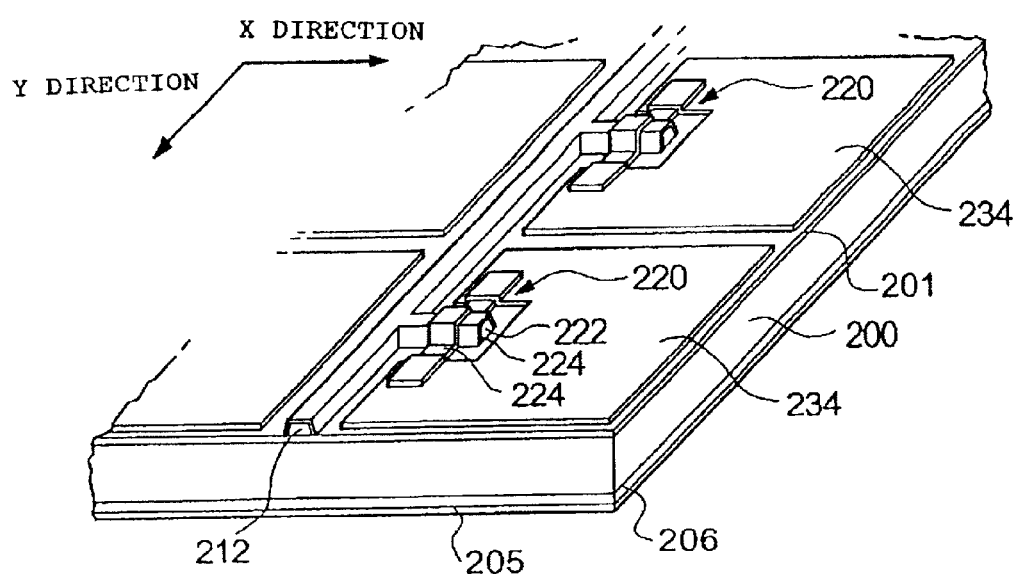

[FIG. 7]
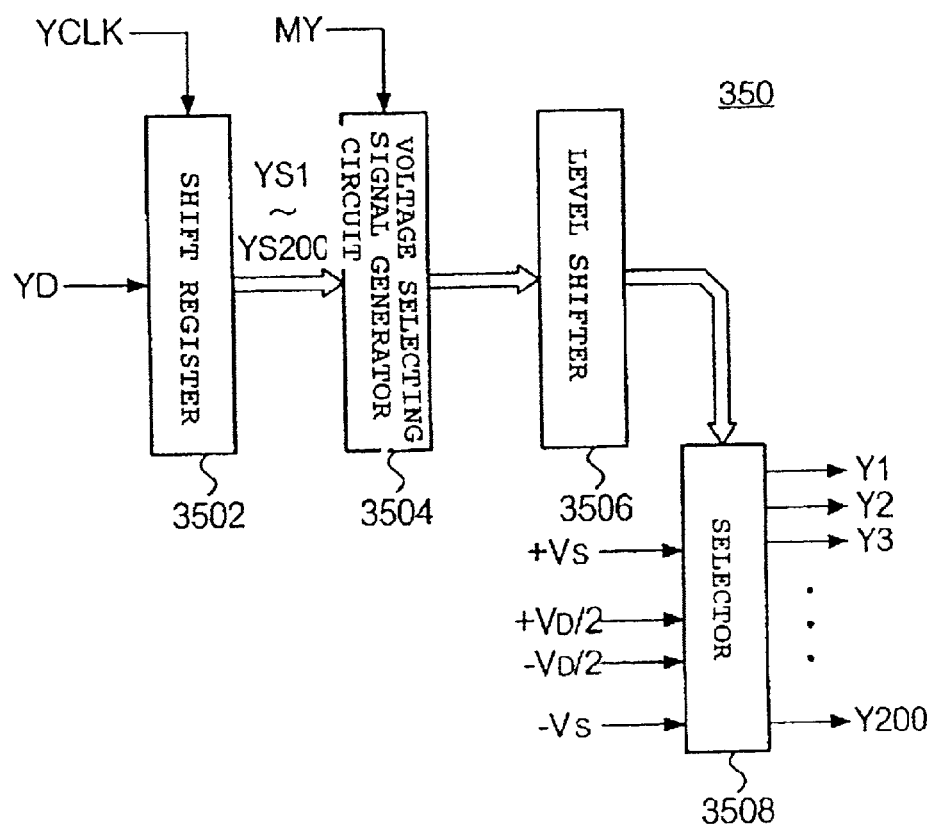

[FIG. 8]
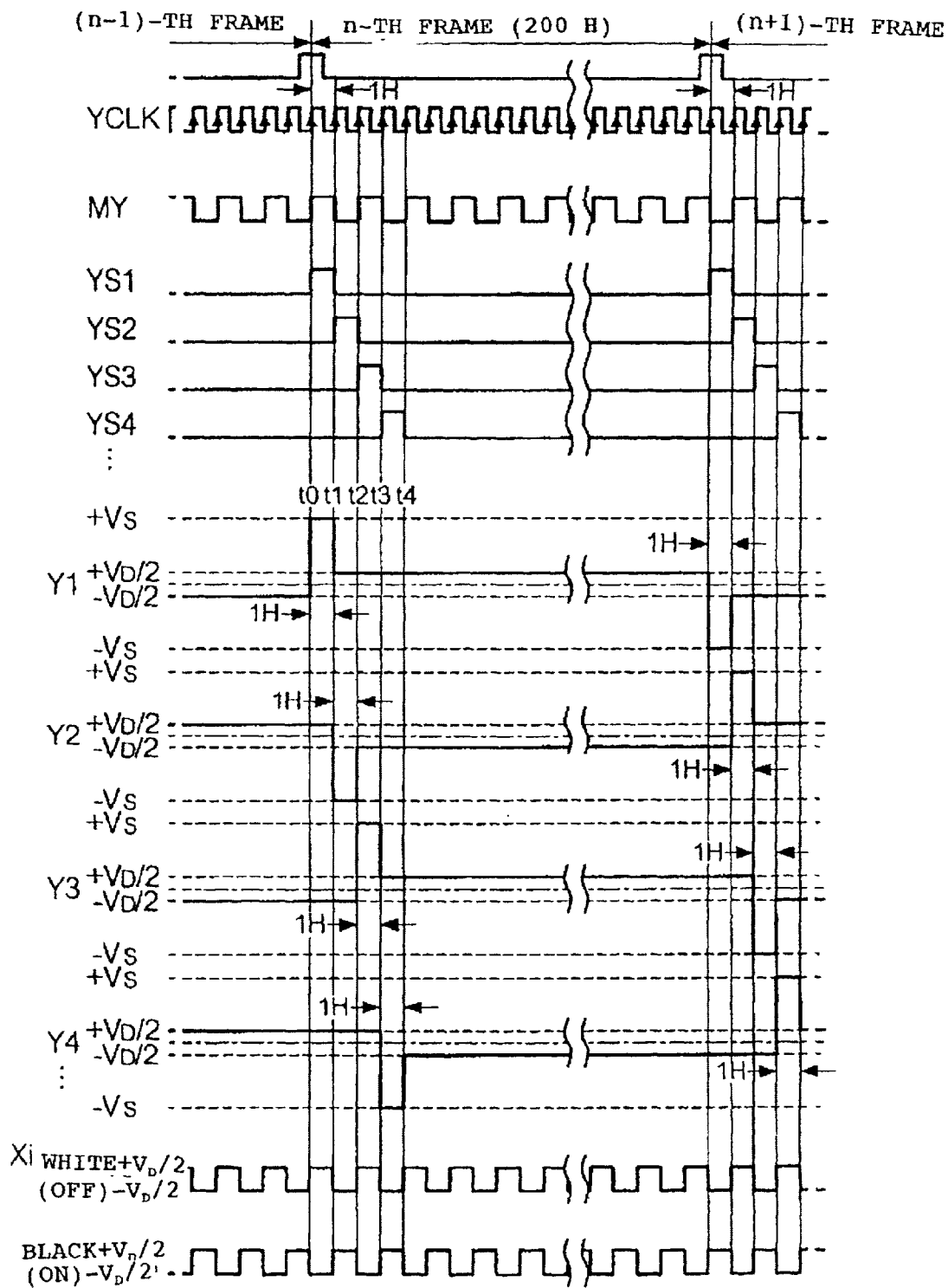

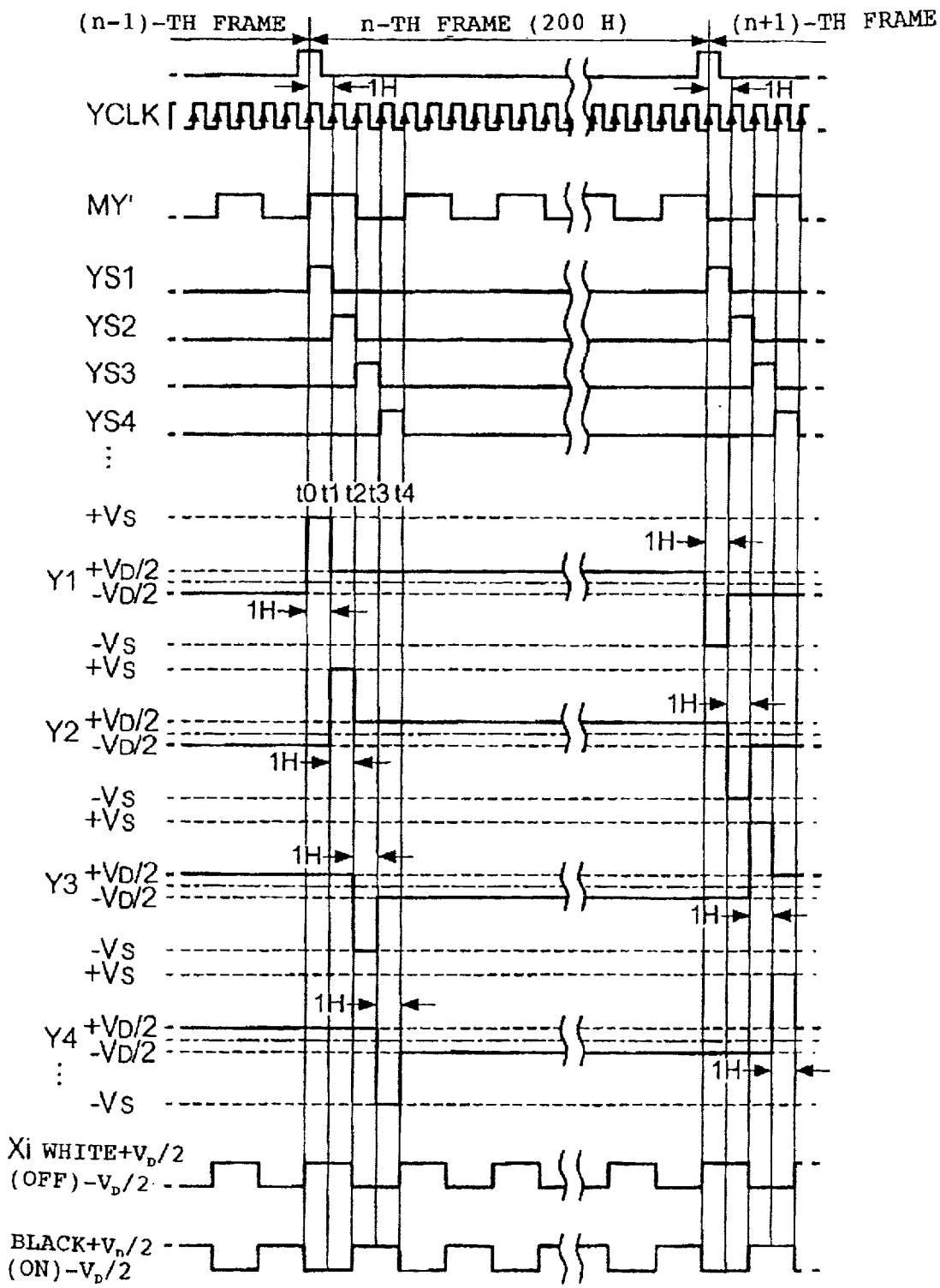
[FIG.9]

[FIG. 10]
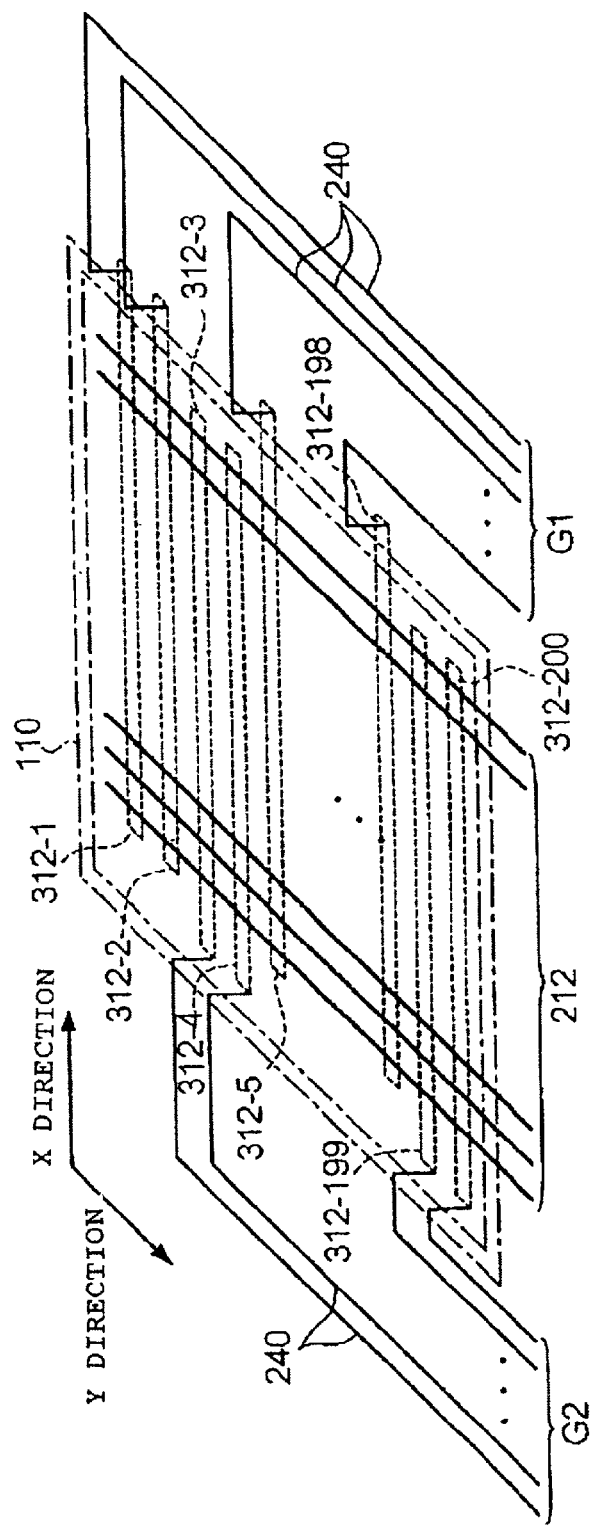

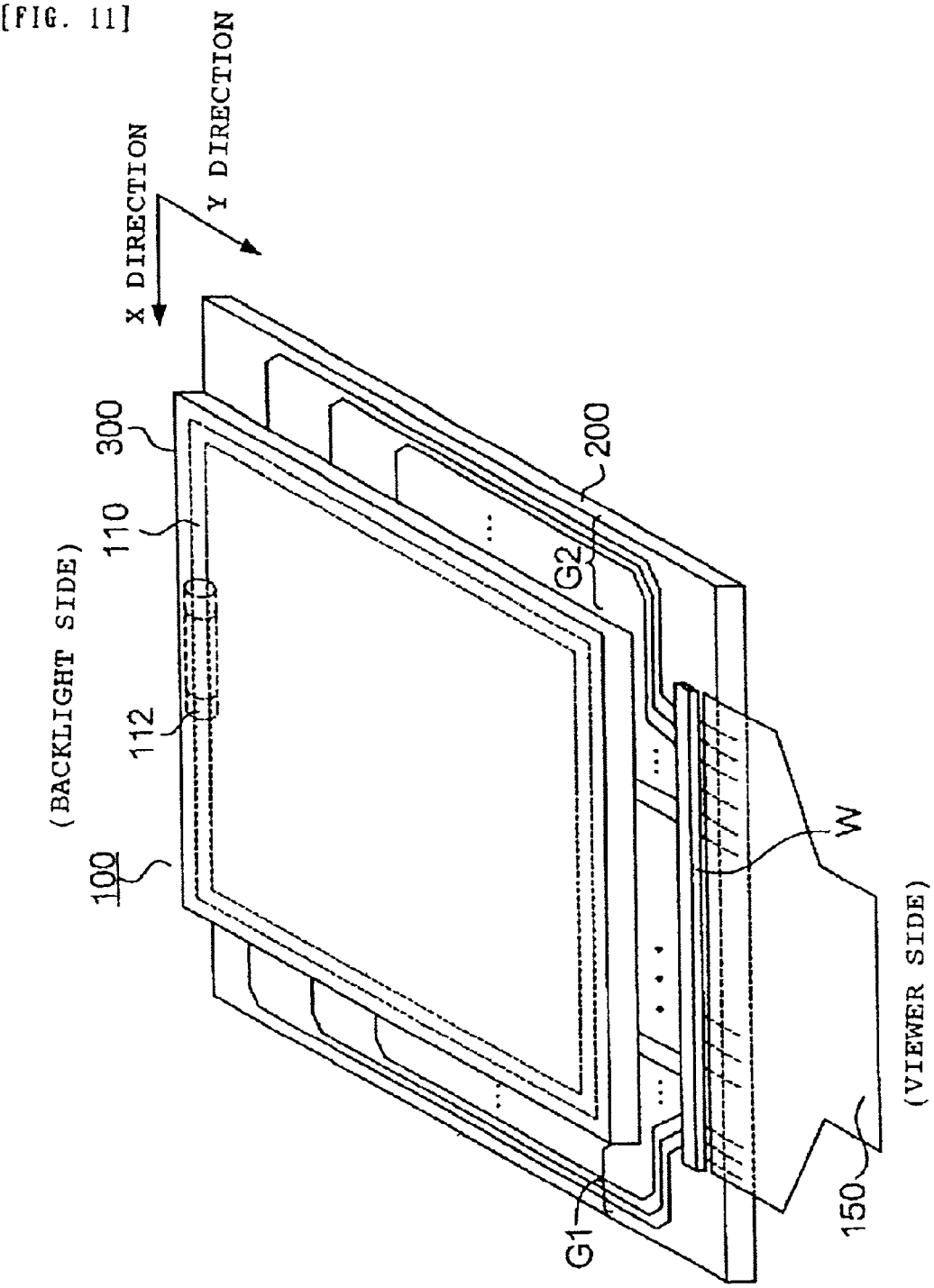
[FIG. 11]

[FIG. 12]
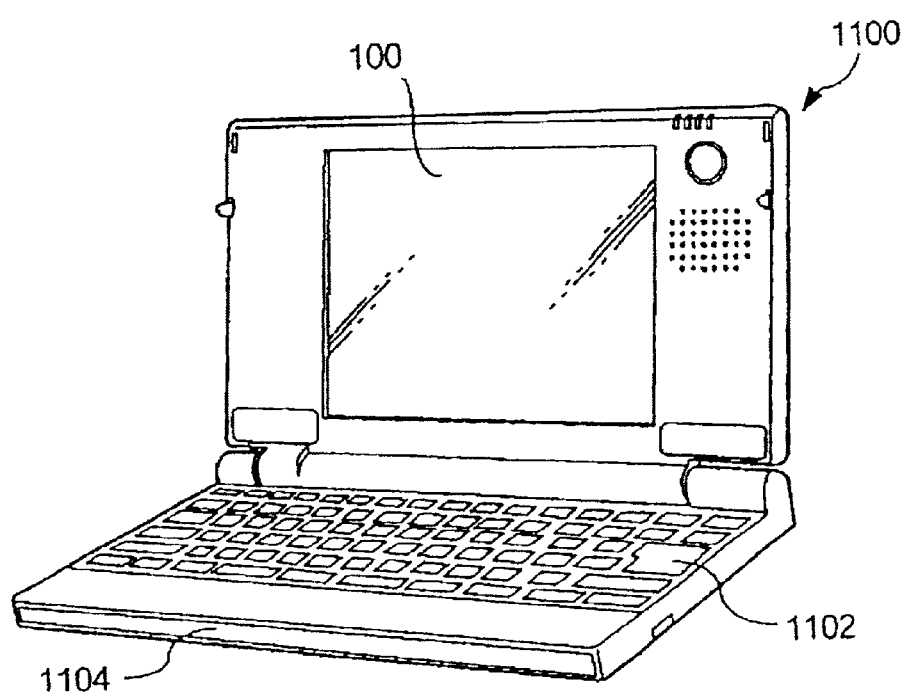

[FIG. 13]
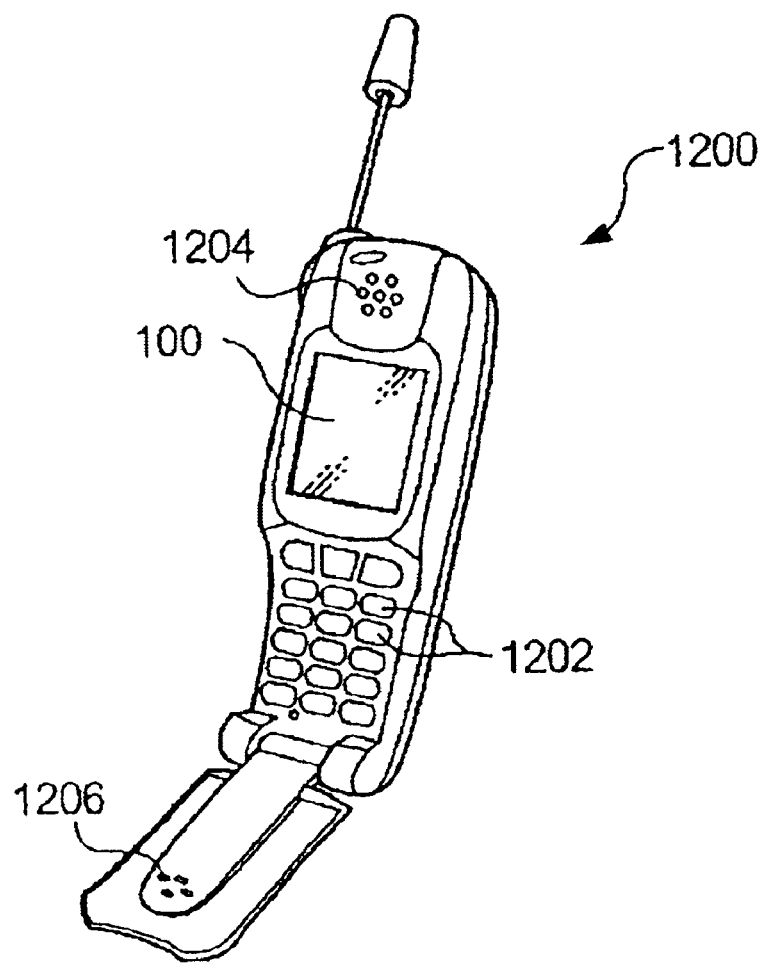

[FIG. 14]
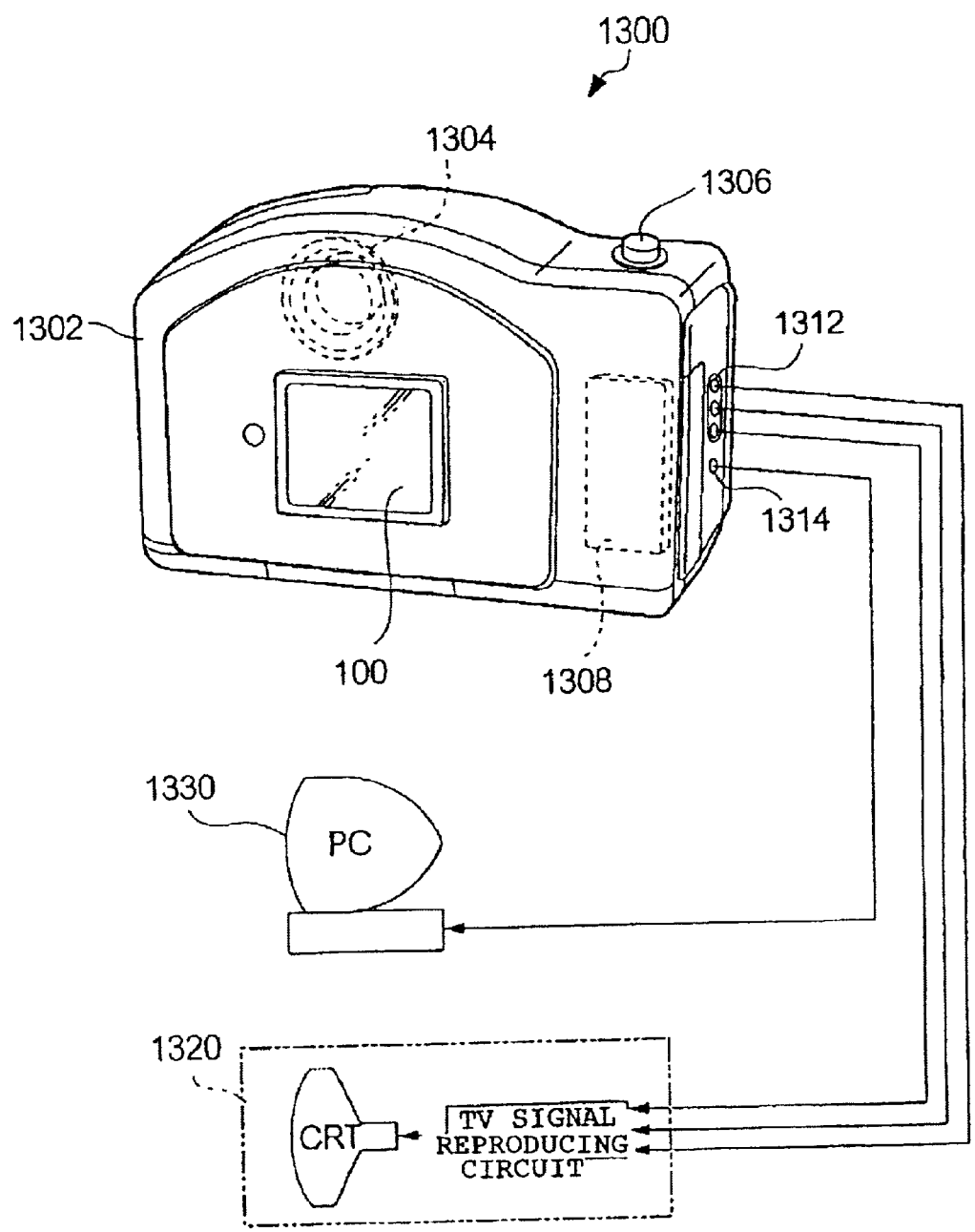

ELECTROOPTICAL PANEL, METHOD FOR DRIVING THE SAME, AND ELECTRONIC EQUIPMENT

BACKGROUND OF THE INVENTION

1. Field of Invention

The present invention relates to an electrooptical panel that allows wirings for supplying signals to a plurality of scanning lines to be routed at a high density, a method for driving the electrooptical panel, and electronic equipment employing the electrooptical panel.

2. Description of Related Art

Currently, an active-matrix liquid-crystal panel can include an element substrate having switching elements which are respectively connected to pixel electrodes arranged in a matrix, and a plurality of data lines, to which the ends of the switching elements are respectively connected. The active-matrix liquid-crystal panel can further include a counter substrate having the scanning lines, a color filter and the like, and a liquid crystal interposed between the two substrates.

A two-terminal non-linear element such as a thin-film diode (TFD) may be used as the switching element in this arrangement. When a voltage above a predetermined threshold voltage of the switching element is supplied between the data line and the scanning line, the switching element is turned on, storing a predetermined charge in a liquid-crystal layer. Subsequent to the storage of charge, a voltage below the predetermined threshold voltage is applied to the switching element, thereby turning off the switching element, when the resistance of the liquid-crystal layer is high enough, the charge is maintained in the liquid-crystal layer. Accordingly, when the quantity of stored charge is controlled by driving the switching element, the liquid crystal may change the orientation state thereof, thereby presenting predetermined information. Since the period of time during which the charge is stored in the liquid-crystal layer in each pixel with a signal voltage applied to turn on the switching element is part of the time, selecting the scanning lines in a time-division manner permits a multiplex driving method in which each of the scanning lines and the data lines are shared with a plurality of pixels.

A plurality of wirings can be arranged to supply each scanning line with the signal voltage in this type of liquid-crystal panel. The wiring is arranged for each scanning line, and as the number of scanning lines becomes large, the spacing between the wirings needs to be narrowed. A low-resistance material is preferably used for the wirings from the standpoint of power saving. To this end, a metal such as chromium is typically used as a wiring material.

However, if a metal is used for a wiring material, the wiring material is subject to degradation due to electrolytic corrosion. The deterioration of the wirings due to electrolytic corrosion becomes serious as the spacing between the wirings is narrow, and as a line-to-line voltage between wirings is large. For this reason, the spacing between the wirings is determined so that reliability of the panel is not deviated from within a permissible range as a result of the deterioration of the wirings due to electrolytic corrosion.

On the other hand, as the spacing between the wirings widens, the area of the wirings occupying in the liquid-crystal panel becomes large, leading to a bulky liquid-crystal panel and a cost increase.

SUMMARY OF THE INVENTION

The present invention has been developed in view of these problems, and it is an object of the present invention to provide a liquid-crystal panel that incorporates high-density wiring while maintaining reliability of the wiring, and to provide electronic equipment incorporating the liquid-crystal panel.

To achieve the above object, an electrooptical panel of the present invention can include a first substrate which has a plurality of scanning lines formed thereon and a second substrate which is opposed to the first substrate with a constant gap maintained therebetween. The electrooptical panel can also include a plurality data lines, and switching elements and pixel electrodes, with each of the switching elements and pixel electrode arranged at each intersection of the scanning lines and the data lines, and an electrooptical material interposed between the first substrate and the second substrate. The electrooptical panel can further include a first wiring group arranged close to one edge of the electrooptical panel, and a second wiring group arranged close the edge opposed to the one edge of the electrooptical panel. The scanning lines are alternately connected to the first wiring group by K lines and the second wiring group by K lines (where K is a natural number) in a manner such that first K scanning lines are connected to the first wiring group, second K scanning lines are connected to the second wiring group, third K scanning lines are connected to the first wiring group and so on. The scanning lines are successively selected for each horizontal scanning period so that the selected scanning line is supplied with a selection voltage, and is then supplied with a non-selection voltage, and the polarities of the selection voltage and the non-selection voltage are inverted every K horizontal scanning periods with respect to an intermediate value, between a lighting voltage and a non-lighting voltage, supplied to the data line.

In accordance with the present invention, each scanning line can be alternately supplied with the selection voltage and the non-selection voltage, each inverted every K horizontal-scanning periods. Since the scanning lines are alternately connected to the first wiring group by K lines and the second wiring group K lines, the polarities of the scanning signals supplied to the wirings coincide with each other. The line-to-line voltage between the wirings remain zero for most of the time, thereby controlling the degradation of the wirings due to electrolytic corrosion. As a result, reliability is maintained while the wiring spacing is narrowed. The wiring area occupying in the electrooptical panel is thus decreased, implementing compact and light-weight design in the panel.

Preferably, the electrooptical panel further includes a sealing member arranged between the first substrate and the second substrate on the inner surfaces thereof close to and along the peripheral edges thereof. The first wiring group can include a plurality of wirings arranged on the second substrate and close to the one edge of the panel, and a first conductor portion, arranged in the sealing portion, for respectively connecting a plurality of scanning lines, out of the scanning lines, corresponding to the first wiring group, with the plurality of wirings. The second wiring group can include a plurality of wirings arranged on the second substrate and close to the edge opposed to the one edge of the panel, and a second conductor portion, arranged in the sealing portion, for respectively connecting a plurality of scanning lines, out of the scanning lines, corresponding to the second wiring group, with the plurality of wirings. In this arrangement, the area of the second substrate is reduced, implementing compact and light-weight design in the electrooptical panel.

In the electrooptical panel above mentioned, the first wiring group may include a plurality of wirings that are connected to a plurality of scanning lines, out of the scanning lines corresponding to the first wiring group, and which is arranged on the first substrate and close to the one edge of the panel. The second wiring group may include a plurality of wirings that are connected to a plurality of scanning lines, out of the scanning lines, corresponding to the second wiring group, and which is arranged on the first substrate and close to the edge opposed to the one edge of the panel. In this arrangement, the area of the second substrate is reduced, implementing compact and light-weight design in the electrooptical panel.

The electrooptical panel preferably includes a first scanning line driving section for supplying the scanning lines connected to the first wiring group with a scanning signal, and a second scanning line driving section for supplying the scanning lines connected to the second wiring group with a scanning signal. Furthermore, the electrooptical panel preferably includes a data line driving section for supplying the data lines with a signal voltage, wherein the first scanning line driving section, the second scanning line driving section, and the data line driving section are encapsulated into a single-chip integrated circuit. Since a driving circuit may be mounted on the electrooptical panel in this arrangement, equipment incorporating the electrooptical panel may be made compact.

Preferably, the switching element is a two-terminal switching element and has a structure of conductor-insulator-conductor. The switching element can be a three-terminal switching element such as a transistor. However, since the three-terminal switching element requires that the scanning line and the data line intersect each other on one substrate, the possibility of a shortcircuit between the lines increases, and the manufacturing process of the panel becomes complex. In contrast, theoretically, the two-terminal switching element is advantageously free from a shortcircuit between the wirings. Since the two-terminal switching element has the structure of conductor/insulator/conductor, one of the conductors may be used as a data line. The insulator may be formed by oxidizing this conductor itself. Therefore, the manufacturing process is simplified.

A driving method of the present invention drives an electrooptical panel which includes a first substrate which has a plurality of scanning lines formed thereon, a second substrate which is opposed to the first substrate with a constant gap maintained therebetween, and has a plurality of data lines, and switching elements and pixel electrodes, with each of the switching elements and pixel electrode arranged at each intersection of the scanning lines and the data lines, and an electrooptical material interposed between the first substrate and the second substrate, a first wiring group arranged close to one edge of either the first substrate or the second substrate, and a second wiring group arranged on either the first substrate or the second substrate close to the edge opposed to the one edge. The scanning lines are alternately connected to the first wiring group by K lines and the second wiring group, by K lines (where K is a natural number) in a manner such that first K scanning lines are connected to the first wiring group, second K scanning lines are connected to the second wiring group, third K scanning lines are connected to the first wiring group, and so on. In the driving method of the electrooptical panel, the scanning lines are successively selected for each horizontal scanning period so that the selected scanning line is supplied with a selection voltage. The polarity of the selection voltage is inverted every K horizontal scanning periods with respect to an intermediate value, between a lighting voltage and a non-lighting voltage, supplied to the data line. In this driving method, the polarities of the scanning signals supplied to the respective wiring groups agree with each other, and the line-to-line voltage between the adjacent wirings remains zero volt for most of the time. Damage of the wirings due to electrolytic corrosion is thus controlled. As a result, the wiring spacing is narrowed while reliability is maintained. The wiring area of the electrooptical panel is decreased, thereby implementing compact and light-weight designs in the electrooptical panel.

Electronic equipment of the present invention includes the electrooptical panel. The electronic equipment thus becomes compact and lightweight while maintaining reliability, as described above.

BRIEF DESCRIPTION OF THE DRAWINGS

The invention will be described with reference to the accompanying drawings, in which like elements are referred to with like numerals, and in which:

FIG. 1 is an exemplary block diagram showing an electrical construction of a display device of a first embodiment of the present invention;

FIG. 2 is a perspective view showing the construction of a liquid-crystal panel of the display device;

FIG. 3 is a cross-sectional view partly showing the liquid-crystal panel and a backlight unit, taken in the X direction;

FIG. 4 is a perspective view showing a major portion of the liquid-crystal panel with a part thereof broken away;

FIG. 5 is a diagram showing the concept of a wiring structure to connect a scanning line to a Y driver in the liquid-crystal panel;

FIG. 6 is a perspective view partly showing in detail pixels of an element substrate in the liquid-crystal panel;

FIG. 7 is an exemplary block diagram showing the construction of the Y driver;

FIG. 8 is a timing diagram showing waveform examples of the liquid-crystal panel in a four-value driving method (with 1 H selection duration and 1 H inverted-level duration);

FIG. 9 is a timing diagram showing waveform examples of the liquid-crystal panel of the second embodiment in a four-value driving method (with 1 H selection duration and 2 H inverted-level duration);

FIG. 10 shows the concept of the wiring structure of the liquid-crystal panel;

FIG. 11 is a perspective view of the external appearance of the liquid-crystal panel as a modification of each of the embodiments of the present invention;

FIG. 12 is a perspective view showing the construction of a personal computer as one example of electronic equipment that incorporates the display device of each of the embodiments of the present invention;

FIG. 13 is a perspective view showing the construction of a mobile telephone as one example of the electronic equipment that incorporates the display device of each of the embodiments of the present invention; and FIG. 14 is a perspective view showing the construction of a digital still camera as one example of the electronic equipment that incorporates the display device of each of the embodiments of the present invention.

DETAILED DESCRIPTION OF PREFERRED EMBODIMENTS

The embodiments of the present invention will now be discussed, referring to the drawings.

The electrical construction of a display device 100 of a first embodiment of the present invention will be discussed. FIG. 1 is an exemplary block diagram showing the electrical construction of the display device 100. As shown, the display device 100 includes a plurality of data lines (segment electrodes) 212 extending in the direction of columns (in the Y direction), a plurality of scanning lines (common electrodes) 312 extending in the direction of rows (in the X direction), and a pixel 116 arranged at each intersection of the data lines 212 and the scanning lines 312. For the purposes of discussion, each scanning line 312 is suffixed with a number to identify from the other scanning lines. For example, a scanning line 312-2 represents a second scanning line.

Each pixel 116 includes a serial connection of a liquid-crystal capacitor 118 and a TFD (Thin-Film Diode) 220 as one example of a switching element. As will be discussed later, the liquid-crystal capacitor 118 is constructed of a liquid crystal as one example of the electrooptical material interposed between the scanning line 312 functioning as a counter electrode and a pixel electrode. In this embodiment, for simplicity of explanation, the total number of the scanning lines 312 is 200, the total number of the data lines 212 is 160, and a display device of a matrix of 200 rows by 160 columns is considered. However, it should be understood that the present invention is not limited to this arrangement.

The display device 100 is a transflective panel. When the light intensity of external light is high, the display device 100 functions as a reflective-type panel. When the light intensity is low, the display device 100 functions as a transmissive-type panel. A backlight unit BL shown in FIG. 1 functions as a light source when the display device 100 is used as a transmissive panel.

A Y driver 350, typically referred to as a scanning line driving circuit, supplies scanning lines 312 respectively with scanning signals Y1, Y2, . . . , Y200. The Y driver 350 of this embodiment selects one of the scanning lines 312 for each horizontal scanning period and supplies the selected scanning line 312 with the selection voltage. The Y driver 350 supplies the scanning line 312 with a non-selection voltage (a hold voltage) during a non-selection period (a hold period).

An X driver 250, typically referred to as a data line driving circuit, supplies pixels 116 corresponding to the scanning line 312 selected by the Y driver 350 with data signals X1, X2, . . . , X160 through the corresponding data lines 212 in accordance with a display content. The construction of the Y driver 350 will be discussed in greater detail below.

A control circuit 400 supplies the X driver 250 and the Y driver 350 with a variety of control signals and clock signals to be discussed below to control the X driver 250 and the Y driver 350. A driving voltage generator circuit 500 generates voltages of ±VD/2, any of which serves as the data signal and the non-selection voltage of the scanning signal, and voltages of ±VS serving as the selection voltage of the scanning signal. Although the data signal and the non-selection voltage of the scanning signal are the same voltage in this embodiment, the data signal and the non-selection voltage may be set to be different. A power source circuit 600 feeds power to the backlight unit BL, the control circuit 400, and the driving voltage generator circuit 500.

In this embodiment, the polarities of the voltages supplied to the scanning lines 312 and the data lines 212 are determined with respect to the intermediate voltage ±VD/2, applied to the data line 212. A voltage above the intermediate voltage is regarded as positive and a voltage below the intermediate voltage is regarded as negative.

The mechanical construction of the display device 100 of this embodiment will now discussed with reference to FIG. 2. FIG. 2 is a perspective view generally showing the construction of the display device 100. As shown, the display device 100 includes an element substrate 200 to the viewer side thereof and a counter substrate 300 on the opposite side thereof. The above-discussed X driver 250, and Y drivers 350a and 350b are mounted on the element substrate 200 using the COG (Chip On Glass) technology. The Y driver 350 in FIG. 1 is divided into the Y drivers 350a and 350b in two IC packages as shown in FIG. 2. The combined function of these drivers is identical to the function of the Y driver 350.

An FPC (Flexible Printed Circuit) board 150 is bonded to an area of the element substrate 200, external to the mounting location of the X driver 250, and supplies the Y drivers 350a and 350b and the X driver 250 with a variety of control signals and voltage signals from the control circuit 400 and the driving voltage generator circuit 500 (see FIG. 1 for these circuits).

Instead of respectively mounting the X driver 250 and the Y driver 350 on the element substrate 200 by using the COG technology, a TCP (Tape Carrier Package) having each driver mounted thereon may be electrically and mechanically connected to the substrate through an anisotropically conductive film arranged at a predetermined location on the substrate using the TAB (Tape Automated Bonding).

FIG. 3 is a cross-sectional view partially showing the liquid-crystal panel 100 and the backlight unit BL, taken along a line running in the X direction. FIG. 4 is a perspective view partially showing the liquid-crystal panel 100. Referring to FIG. 3 and FIG. 4, the element substrate 200 is up and the counter substrate 300 is down.

As shown, the liquid-crystal panel 100 can include the element substrate 200, and the counter substrate 300, both of which are glued, with a constant gap maintained therebetween, to each other with a sealing member 110 into which electrically conductive particles (electrically conductive members) 114 serving as a spacer are mixed. An STN (Super Twisted Nematic) type liquid crystal 160 is encapsulated into the gap. The sealing member 110 is formed in a frame configuration along and close the edge of either the element substrate 200 or the counter substrate 300 as shown in FIG. 2. To introduce the liquid crystal 160, part of the sealing member 110 is opened. After encapsulating the liquid crystal, the opening is closed with a sealant 112.

Referring to FIG. 3 and FIG. 4, a reflector 301 having apertures 302 is formed on the counter surface of the counter substrate 300. The material of the reflector 301 is aluminum, APC (Ag, Pt, Cu), or the like. The APC is an alloy containing 98% weight percent silver with the remaining metals being platinum and copper, and offers a reflectance higher than that of aluminum. The reflector 301 reflects external light beams entering from the outer side (from the viewer side) of the element substrate 200.

A striped color filter 303 is formed on the inner surface of the reflector 301. The color filter 303 is partitioned by a black matrix 304 to prevent color mixing between the pixels and to block light.

The scanning lines 312, fabricated of an electrically conductive, transparent member such as an ITO (Indium Tin Oxide), is formed on the inner surface of the color filter 304. The scanning lines 312 extend in the direction of rows (in the X direction). An alignment layer (not shown) is formed on the inner surface of the scanning lines 312, and is subjected to a rubbing process in a predetermined direction. A retardation film 305 and a polarizer 306 are laminated on the outer surface (on the backlight side) of the counter substrate 300. The absorption axis of the polarizer 306 is set to correspond to the direction of the rubbing process of the alignment layer. The retardation film 305 is used for color correction.

The scanning line 312 is electrically connected to a wiring 240 through an electrically conductive member 114 in the sealing member 110. Through the wiring 240, the scanning signal is supplied to the scanning line 312 from the outside. The material of the wiring 240 may be an electrically conductive member such as chromium or ITO. To lower resistance of the wiring 240, a metal is used here.

A rectangular pixel electrode 234 is arranged in the vicinity of the data line 212 running in the Y direction (in the direction of columns) on the counter surface of the counter substrate 300. Arranged on these elements is an alignment layer (not shown) which is subjected to a rubbing process in a predetermined direction. The pixel electrode 234 is fabricated of an electrically conductive, transparent member such as ITO.

A retardation film 205 and a polarizer 206 are laminated on the outer surface (on the viewer side) of the element substrate 200. The absorption axis of the polarizer 206 is set to correspond to the direction of the rubbing process to the alignment layer. The backlight unit BL is arranged on the outer surface of the counter substrate 300 to emit uniform light rays.

FIG. 5 shows a concept of a wiring structure for connecting the scanning line to the Y drivers 350a and 350b. FIG. 5 is obtained by lifting the left-hand edge of the element substrate 200 with the right-hand edge of the element substrate 200 fixed to pivot the liquid-crystal panel 100 shown in FIG. 2 about the left-hand edge thereof by 180 degrees.

As shown, the scanning lines 312 are interdigitally arranged with odd-numbered scanning lines 312 extending from the right-hand side and even-numbered scanning lines 312 extending from the left-hand side. Specifically, odd-numbered scanning lines 312-1, 312-3, . . . , 312-199 are connected to the first wiring group G1 on the right-hand side portion of the sealing member 110 (a first conductor portion). The first wiring group G1 is routed near and along the right-hand side edge of the element substrate 200 and is then connected to the Y driver 350a. On the other hand, even-numbered scanning lines 312-2, 312-4, . . . , 312-200 are connected to the second wiring group G2 on the left-hand side portion of the sealing member 110 (a second conductor portion). The second wiring group G2 is routed near and along the left-hand side edge of the element substrate 200 and is then connected to the Y driver 350.

The spacing between wirings 240 forming the first wiring group G1 and the second wiring group G2 is determined by taking into consideration the amount degradation due to electrolytic corrosion. The size of electrolytic corrosion taking place in the wirings becomes large as the spacing between the wirings becomes short and as the voltage between the wirings becomes high. In this embodiment, in any given frame, the scanning signals are generated so that the scanning signal supplied to the first wiring group G1 is positive while the scanning signal supplied to the second wiring group G2 is negative. As will be discussed in greater detail later, this arrangement allows the line-to-line voltage between the wirings to remain equal for most of the time except the selection period of each scanning line, thereby preventing the wirings from being electrolytically corroded. The spacing between the wirings is thus narrowed, allowing the wirings to be routed at a high density.

The detail construction of the pixel 116 in the element substrate 200 will now be discussed. FIG. 6 is a partial perspective view of the pixel 116. Referring to FIG. 6, a matrix of rectangular pixel electrodes 234, fabricated of an electrically conductive, transparent member such as ITO, is arranged on the inner surface of the element substrate 200, and 200 pixel electrodes 234 in the same column are commonly connected to a single data line 212 via respective TFDs 220. The TFD 220 can be fabricated of tantalum or a tantalum-based alloy, if viewed from the substrate, and includes a first conductor 222 that is branched off from the data line 212 in a T-shaped configuration, an insulator 224 that is formed by anodically oxidizing the first conductor 222, and a second conductor 226 fabricated of chromium, or the like. The TFD 220 thus has a sandwich structure of conductor-insulator-conductor. The TFD 220 therefore has diode switching characteristics that are non-linear current-voltage curves in both positive and negative directions.

The insulator 201 formed on the top surface of the element substrate 200 has transparent and insulating properties. The use of the insulator 201 is intended to prevent the first conductor 222 from peeling off in a heat treatment subsequent to the deposition of the second conductor 226, and to prevent impurities from diffusing into the first conductor 222. When the peeling of the first conductor 222 and the diffusion of the impurities are not problematic, the insulator 201 may be dispensed with.

As already discussed above, the scanning line 312, fabricated of the ITO or the like, is formed on the inner surface of the counter substrate 300 and extends in a direction perpendicular to the data line 212. The scanning line 312 is opposed to the pixel electrode 234. In this arrangement, the scanning line 312 serves as a counter electrode against the pixel electrode 234. Referring to FIG. 1, the liquid-crystal layer 118 is thus constructed of the scanning line 312, the pixel electrode 234, and the liquid crystal 160 interposed between the scanning line 312 and the pixel electrode 234, at each intersection of the data line 212 and the scanning line 312.

The control circuit 400 shown in FIG. 1 generates the following control signals and clock signals. A start pulse YD, generated first by the control circuit 400, is output at the beginning of one vertical scanning period (one frame) as shown in FIG. 8. A clock signal YCLK is a reference signal for the scanning lines, and has a period 1 H corresponding to one horizontal scanning period as shown in FIG. 8. An alternating driving signal MY dictates the polarity of the selection voltage for the scanning signal, and is inverted in level every one horizontal scanning period 1 H.

The Y driver 350 will now be discussed in greater detail. FIG. 7 is an exemplary block diagram showing the construction of the Y driver 350. As shown, a shift register 3502 is a shift register of 200 bits corresponding to the total number of scanning lines 312. The shift register 3502 shifts the start pulse YD supplied, at the beginning of one vertical scanning period, in response to the clock signal YCLK having the period equal to one horizontal scanning period 1 H, thereby successively outputting transfer signals YS1, YS2, . . . , YS200. The transfer signals YS1, YS2, . . . , YS200 respectively correspond to a first row, a second row, . . . , a 200-th row of the scanning lines 312 in a one-to-one correspondence. When the transfer signal is driven to a high level, the corresponding scanning line 312 is selected.

A voltage selecting signal generator circuit 3504 generates a voltage selecting signal, which is supplied to each scanning line 312, in response to the alternating driving signal MY and the transfer signals YS1, YS2, . . . , YS200. In this embodiment, as already discussed above, the voltages of the scanning signals applied to the scanning lines 312 are four voltages: +VS (a positive side selection voltage), +VD/2 (a positive side non-selection voltage), −VS (a negative side non-selection voltage), and −VD/2 (a negative side selection voltage). The non-selection voltage is +VD/2 after the selection voltage of +VS was supplied, and is −VD/2 after the selection voltage of −VS was supplied. The non-selection voltage is thus dictated by a immediately prior selection voltage.

When any of the transfer signals YS1, YS2, . . . , YS200 are driven to a high level and the selection of the corresponding scanning line 312 is commanded, the voltage level of the scanning signal to the corresponding scanning line 312 is set to be a selection voltage corresponding to the polarity matching the signal level of the alternating driving signal MY by the voltage selection signal generator circuit 3504. When any of the transfer signals YS1, YS2, . . . , YS200 are driven to a low level, the non-selection of the corresponding scanning line 312 is commanded. The voltage level of the scanning signal of the corresponding scanning line 312 is set to be a non-selection voltage having the same polarity as that of the immediately prior selection voltage.

A level shifter 3506 enlarges the voltage amplitude of the voltage selecting signal output from the voltage selecting signal generator circuit 3504. A selector 3508 selects a voltage which is indicated by the voltage selecting signal, the amplitude of which is enlarged by the level shifter 3506, and the selector 3508 applies the voltage to each of the corresponding scanning lines 312.

The driving method of driving the liquid-crystal panel 100 will now be discussed in greater detail. A four-value driving method (with 1 H selection period and 1 H level-inverted period) as an example is here discussed. FIG. 8 is a waveform diagram of the four-value driving method. In this driving method, after the selection voltage of +VS was applied for one horizontal scanning period 1 H as a scanning signal Yj (where j is a natural number within a range from 1 to 200), the non-selection voltage of +VD/2 is applied and held for a hold period. After time elapse of one vertical scanning period (one frame) 1V from the prior selection, the selection voltage of −VS is applied, and then, the non-selection voltage of −VD/2 is applied and held for a hold period. This series of steps is repeated. On the other hand, one of the voltages ±VD/2 is applied as a data signal Xi. When the selection voltage of +VS as a scanning signal Yj is applied to one scanning line, the selection signal −VS as a scanning signal Yj+1 is applied to the next scanning line. In this way, the polarity of the selection voltage is inverted every horizontal scanning period 1 H.

In the four-value driving method (with the 1 H selection period and 1 H level-inverted period), the voltage of the data signal Xi is −VD/2 to present an ON display (a black display in the normally white mode, for example) on the pixel 116 when the selection voltage +VS is applied and is +VD/2 to present an OFF display (a white display in the normally white mode) on the pixel 116. When the selection voltage −VS is applied, the voltage of the data signal Xi is +VD/2 to present an ON display on the pixel 116, and is −VD/2 to present an OFF display on the pixel 116.

As already discussed above, the odd-numbered scanning lines 312-1, 312-3, . . . , 312-199 are connected to the first wiring group G1, while the even-numbered scanning lines 312-2, 312-4, . . . , 312-200 are connected to the second wiring group G2. Now considered are the scanning signals Y1 and Y3, as the scanning signals supplied to two adjacent wirings 240 among the wirings 240 constituting the first wiring group G1. As shown in FIG. 8, at an n-th frame, the scanning signals Y1 and Y3 are different in signal level within 3 H periods from time t0 to time t3, but are at the same signal level equal to +VD/2 for the remaining period of time.

The scanning signals Y2 and Y4 are different in signal level within 3 H periods from time t1 to time t4, but are at the same signal level equal to −VD/2 for the remaining period of time. The scanning signals Y2 and Y4 are respectively supplied to two adjacent wirings among the wirings constituting the second wiring group G2.

In this embodiment, the polarity of the selection voltage is inverted every horizontal scanning period 1 H. The odd-numbered scanning lines 312-1, 312-3, . . . , 312-199 are routed to be connected to the first wiring group G1, and the even-numbered scanning lines 312-2, 312-4, . . . , 312-200 are routed to be connected to the second wiring group G2. The voltages of the adjacent wirings among the wirings 240 forming each of the first wiring group G1 and the second wiring group G2 are equalized for most of the time. As a result, electrolytic corrosion of the wirings 240 is substantially reduced, and the spacing between the wirings is narrowed. The lateral extension areas of the element substrate 200 extending beyond the side edges of the counter substrate 300 are thus narrowed. The area of the liquid-crystal panel 100 can be reduced, thereby allowing compact, light-weight and low-cost designs to be implemented.

The liquid-crystal device of a second embodiment of the present invention will be now discussed. The electrical construction of the liquid-crystal device remains the same as that of the first embodiment shown in FIG. 1, except that a control circuit 400' is substituted for the control circuit 400. Although the control circuit 400 in the first embodiment generates the alternating driving signal MY having the period equal to one horizontal scanning period 1 H as shown in FIG. 8, the control circuit 400' in the second embodiment generates a alternating driving signal MY' having the period equal to two horizontal scanning periods 2 H. This is the difference between the control circuit 400 and the control circuit 400'. Specifically, the liquid-crystal device of the second embodiment inverts the polarity of each of the scanning signals Y1, Y2, . . . , Y200 every two horizontal scanning periods 2 H.

FIG. 9 is a waveform diagram showing the scanning signals Y1, Y2, Y3, Y4, . . . , Y200 and a data signal Xi applied to the pixels 116 in the four-value driving method (with 1 H selection period and 2 H inverted-level period) in the second embodiment. As shown, the alternating driving signal MY' has the period of two horizontal scanning periods 2 H, and remains at a high level from time t0 to time t2, and remains at a low level from time t2 to time t4. As already discussed, the voltage selecting signal generator circuit 3504 (see FIG. 7) sets, to the selection voltage of the polarity matching the signal level of the alternating driving signal MY', the voltage level of the scanning signal to the scanning line 312 selected in response to the transfer signals YS1, YS2, . . . , YS200.

At an n-th frame, the polarity of the scanning signals Y1 and Y2 are positive while the scanning signals Y3 and Y4 are negative, as already discussed.

When the polarity of the scanning signal is inverted on every predetermined plural number of scanning lines, the line-to-line voltage between the adjacent wirings cannot be set to be about zero if the scanning lines are interdigitally arranged to be alternately connected to the first wiring group G1 and the second wiring group G2 as discussed in the first embodiment.

In this embodiment, therefore, the scanning lines select between the first wiring group G1 and the second wiring group G2, depending on the polarity of the scanning signal corresponding to the scanning line. FIG. 10 is a conceptual diagram showing the wiring structure of the liquid-crystal panel used in the second embodiment. As shown, the scanning lines 312 are alternately connected to the first wiring group G1 and the second wiring group G2 on a two lines by two lines basis in a manner such that first two scanning lines are connected to the first wiring group G1, the second two scanning lines are connected to the second wiring group G2, and so on.

For example, the scanning signals Y1 and Y2 are fed to the wirings 240 respectively leading to the scanning line 312-1 and the scanning line 312-2 in the first wiring group G1. As shown in FIG. 9, the scanning signals Y1 and Y2 remain the same in level except a duration from time t0 to t2 in an n-th frame. In other words, the line-to-line voltage between the adjacent wirings 240 is set to be zero for most of the time.

Since the second embodiment substantially reduces electrolytic corrosion of the wiring 240 as much as the first embodiment does, the spacing between the wirings is narrowed. As a result, the right-hand side and left-hand side lateral areas of the element substrate 200 extending beyond the side edges of the counter substrate 300 are narrowed. The overall area of the liquid-crystal panel 100 is thus narrowed, allowing compact, light-weight, and low-cost designs to be implemented.

The polarity of the selection voltage is inverted every horizontal scanning period in the first embodiment, and the polarity of the selection voltage is inverted every two horizontal scanning periods in the second embodiment. However, it is to be understood that the present invention is not limited to these arrangements. The polarity of the selection voltage may be inverted every three or more number of horizontal scanning periods. More generally, when the scanning lines 312 are successively selected and supplied with the selection voltage every horizontal scanning period, and the polarity of the selection voltage is inverted with respect to the intermediate value between the lighting voltage and the non-lighting voltage, applied to the data line 212, every K horizontal scanning periods (K is a natural number), the scanning lines 312 are alternately connected to the first wiring group G1 and the second wiring group G2 by K lines by K lines.

The Y driver 350 in each of the preceding embodiments is formed of two chip ICs. Alternatively, the X driver 250 and the Y driver 350 may be built into a single chip integrated circuit W as shown in FIG. 11.

In each of the above embodiments, the transflective type liquid-crystal panel 100 has been described as an example. The feature of the present invention lies in the relationship between the wiring structure of the scanning lines 312 and the polarity of the scanning signal. Therefore, the liquid-crystal panel 100 may be a transmissive type panel which employs the backlight only as a light source, or may be a reflective type panel which employs external light only as a light source.

In each of the above embodiments, the scanning lines 312 arranged on the counter substrate 300 are respectively connected to the first wiring group G1 and the second wiring group G2 on the element substrate 200, through the sealing member 110. However, it is to be understood that the present invention is not limited to this arrangement. The first wiring group G1 and the second wiring group G2 may be arranged on the counter substrate 300. In this case, the Y driver 350 may be arranged on the counter substrate 300 and the X driver 250 may be arranged on the element substrate 200, with one FPC board 150 connected to each substrate. Alternatively, the data lines 212 may be routed to the X driver 250 by arranging the X driver 250 on the counter substrate 300 and by connecting the two substrates via the sealing member 110.

Electronic equipment incorporating the display device of each of the preceding embodiments will now be discussed.

FIG. 12 is a perspective view showing the construction of the personal computer 1100 where the display device is incorporated as a display unit. As shown, the personal computer 1100 includes a main unit 1104 with a keyboard 1102, and a liquid-crystal panel 100 as a display unit. Although a backlight unit BL is arranged behind the liquid-crystal panel 100 to enhance visibility of an image, the backlight unit BL is not shown in FIG. 12 because it does not appear in the external view of the mobile computer 1100.

FIG. 13 is a perspective view showing the construction of the mobile telephone 1200 in which the display device is incorporated as a display unit. As shown, the mobile telephone 1200 includes a plurality of control buttons 1202, an ear piece 1204, a mouth piece 1206, and the liquid-crystal panel 100. To assure visibility of an image, a backlight unit BL is arranged behind the liquid-crystal panel 100. The backlight unit BL is not shown in FIG. 13, because it does not appear in the external view of the mobile telephone 1200. As already discussed, since the liquid-crystal panel 100 incorporates the narrow area element substrate 200, the liquid-crystal panel 100 is appropriate for use in equipment such as the mobile telephone 1200 which requires compact and light-weight designs.

FIG. 14 is a perspective view showing the construction of the digital still camera 1300 that incorporates the above-referenced display device as a view finder and the main connection thereof with an external device.

In contrast with a general silver-film camera that exposes a film to an optical image of an object, the digital still camera 1300 generates a video signal by photoelectrically converting an optical image of an object through an image pickup device such as a CCD (Charge-Coupled Device). The above-referenced liquid-crystal panel 100 is mounted on the back of a case 1302 of the digital still camera 1300. The liquid-crystal panel 100 functions as a view finder to display the image of the object. Arranged on the front of the case 1302 (behind the case 1302 in FIG. 14) is a photosensitive unit 1304 including an optical lens and the CCD.

When a photographer presses a shutter button 1306 after recognizing the image of an object displayed on the liquid-crystal panel 100, the image taken by the CCD at the moment is transferred to and stored in a memory on a circuit board 1308. The digital still camera 1300 is provided on the side of the case 1302 with a video signal output terminal 1312 and an input/output terminal 1314 for data exchange. As shown, a television monitor 1320 can be connected to the video signal output terminal 1312, and a personal computer 1330 can be connected to the input/output terminal 1314 for data exchange. In response to predetermined operational steps, the video signal stored in the memory of the circuit board 1308 is output to the television monitor 1320 and the personal computer 1330.

Besides the personal computer shown in FIG. 12, the mobile telephone shown in FIG. 13, and the digital still camera shown in FIG. 14, the electronic equipment of the present invention may be any of a diversity of electronic equipment including a liquid-crystal display television, a viewfinder type or direct monitoring type video cassette recorder, a car navigation system, a pager, an electronic pocketbook, an electronic tabletop calculator, a word processor, a workstation, a video phone, a POS terminal, an apparatus having a touch panel and the like. It should be understood that any of these pieces of electronic equipment may incorporate the above-referenced display device.

As described above, in accordance with the present invention, the line-to-line voltage between the adjacent wirings, among the wirings constituting each wiring group, becomes substantially zero volt. Degradation of the wirings due to electrolytic corrosion is controlled even if the spacing between the wirings is narrowed.

While this invention has been described in conjunction with the specific embodiments thereof, it is evident that many alternatives, modifications and variations will be apparent to those skilled in the art. Accordingly, preferred embodiments of the invention as set forth herein are intended to be illustrative not limiting. There are changes that may be made without departing from the spirit and scope of the invention.

What is claimed is:

1. An electrooptical panel, comprising a first substrate including a plurality of scanning lines formed thereon, a second substrate that is disposed opposing the first substrate so that a constant gap is maintained therebetween, a sealing portion arranged between the first substrate and the second substrate on the inner surfaces thereof adjacent to and along the peripheral edges thereof, the second substrate having a plurality data lines, switching elements and pixel electrodes, with each of the switching elements and pixel electrode arranged at each intersection of the scanning lines and the data lines, and an electrooptical material disposed in the gap between the first substrate and the second substrate, wherein the electrooptical panel further comprises:

a first wiring group arranged adjacent to a first edge of the electrooptical panel wherein the first wiring group includes a first plurality of wirings arranged on the second substrate and adjacent to the first edge of the panel, and a first conductor portion, arranged in the sealing portion, for respectively connecting a plurality of scanning lines, out of the scanning lines, corresponding to the first wiring group, with the first plurality of wirings;

a second wiring group arranged adjacent to a second edge of the electrooptical panel that is opposite to the first edge of the electrooptical panel wherein the second wiring group includes a second plurality of wirings arranged on the second substrate adjacent to the second edge of the panel, and a second conductor portion, arranged in the sealing portion, for respectively connecting a plurality of scanning lines, out of the scanning lines, corresponding to the second wiring group, with the second plurality of wirings; and wherein the scanning lines are alternately connected to the first wiring group by K lines and the second wiring group by K lines in a manner such that first K scanning lines are connected to the first wiring group, second K scanning lines are connected to the second wiring group, third K scanning lines are connected to the first wiring group, and so on, and the first plurality of wirings which are connected to the plurality of scanning lines, out of the scanning lines corresponding to the first wiring group, are extended on the first substrate along the first edge of the panel, and the second plurality of wirings which are connected to the plurality of scanning lines, out of the scanning lines corresponding to the second wiring group, extended on the first substrate along the second edge of the panel, the scanning lines being successively selected for each horizontal scanning period so that the selected scanning line is supplied with a selection voltage, and is then supplied with a non-selection voltage, and the polarities of the selection voltage and the non-selection voltage are inverted every K horizontal scanning periods with respect to an intermediate value, between an ON voltage and an OFF voltage, supplied to the data line, and the scanning lines connected to the first wiring group are supplied with the same polarities of the selection voltage and non-selection voltage, and the scanning lines connected to the second wiring group are supplied with the same polarities of the selection voltage and non-selection voltage.

2. The electrooptical panel according to claim 1, wherein the switching element is a two-terminal switching element and has a structure of conductor-insulator-conductor.

3. Electronic equipment comprising an electrooptical panel according to claim 1.

4. A driving method for driving an electrooptical panel including a first substrate having a plurality of scanning lines formed thereon, a second substrate that is disposed opposing the first substrate so that a constant gap is maintained therebetween, a sealing portion arranged between the first substrate and the second substrate on the inner surfaces thereof adjacent to and along the peripheral edges thereof, the second substrate having a plurality data lines, switching elements and pixel electrodes, with each of the switching elements and pixel electrode arranged at each intersection of the scanning lines and the data lines, and an electrooptical material disposed in the gap between the first substrate and the second substrate, a first wiring group arranged adjacent to a first edge of either the first substrate or the second substrate, and a second wiring group arranged on either the first substrate or the second substrate on a second edge that is opposed to the first edge, wherein the scanning lines are alternately connected to the first wiring group by K lines and the second wiring group by K lines in a manner such that first K scanning lines are connected to the first wiring group, second K scanning lines are connected to the second wiring group, third K scanning lines are connected to the first wiring group and so on, and the first wiring group further comprises a first plurality of wirings which are connected by a first conductor portion arranged in the sealing portion to a plurality of scanning lines, out of the scanning lines corresponding to the first wiring group, and which are extended on the first substrate and along the first edge of the panel, and the second wiring group further comprises a second plurality of wirings which are connected by a second conductor portion arranged in the sealing portion to a plurality of scanning lines, out of the scanning lines corresponding to the second wiring group, and which are extended on the first substrate and along the second edge of the panel, and wherein the scanning lines are successively selected for each horizontal scanning period so that the selected scanning line is supplied with a selection voltage, and is then supplied with a non-selection voltage, and the polarities of the selection voltage and the non-selection voltage are inverted every K horizontal scanning periods with respect to an intermediate value, between an ON voltage and an OFF voltage, supplied to the data line, and the scanning lines connected to the first wiring group are supplied with the same polarities of the selection voltage and non-selection voltage, and the scanning lines connected to the second wiring group are supplied with the same polarities of the selection voltage and non-selection voltage.

5. Electronic equipment comprising an electrooptical panel according to claim 4.

* * * * *